(12) United States Patent
Stenger

(10) Patent No.: US 7,260,213 B2
(45) Date of Patent: Aug. 21, 2007

(54) TELEPHONE ECHO CANCELLER

(75) Inventor: Alexander Stenger, Fürth (DE)

(73) Assignee: NXP B.V., Eindhoven (NL)

( * ) Notice: Subject to any disclaimer, the term of this patent is extended or adjusted under 35 U.S.C. 154(b) by 121 days.

(21) Appl. No.: 10/541,417

(22) PCT Filed: Dec. 22, 2003

(86) PCT No.: PCT/IB03/06287
§ 371 (c)(1),
(2), (4) Date: Jul. 1, 2005

(87) PCT Pub. No.: WO2004/064366
PCT Pub. Date: Jul. 29, 2004

(65) Prior Publication Data
US 2006/0067519 A1    Mar. 30, 2006

(30) Foreign Application Priority Data
Jan. 8, 2003    (EP) .................................. 03100017

(51) Int. Cl.
*H04M 9/08* (2006.01)
(52) U.S. Cl. .............................. 379/406.07; 379/406.08
(58) Field of Classification Search ............ 379/406.07
See application file for complete search history.

(56) References Cited

U.S. PATENT DOCUMENTS

| | | | |
|---|---|---|---|
| 3,781,720 A | * 12/1973 | Mueller | .................. 333/18 |
| 5,600,714 A | * 2/1997 | Eppler et al. | .......... 379/406.08 |
| 5,636,323 A | * 6/1997 | Umemoto et al. | .......... 704/226 |
| 6,282,176 B1 | * 8/2001 | Hemkumar | ................ 370/276 |
| 7,020,278 B2 | * 3/2006 | Farrell et al. | .......... 379/406.05 |
| 2002/0154761 A1 | * 10/2002 | McLaughlin et al. | .. 379/388.01 |

FOREIGN PATENT DOCUMENTS

| WO | WO 00/70853 A2 | 11/2000 |
|---|---|---|
| WO | WO/00/70853 A3 | 11/2000 |
| WO | WO 0070853 | 11/2000 |

* cited by examiner

*Primary Examiner*—Ramnandan Singh

(57) ABSTRACT

The invention relates to an echo canceling device and method for an arrangement for transmitting audio signals, in particular uttered speech with an echo filter for canceling echo. The echo filter is arranged between an input channel (1) and an output channel (4). The input channel (1) leads a first electrical input signal to a converter (2) for converting the electrical signal into a first audio signal. The output channel (4) transmits an electrical signal from a converter (3) which converts a second audio signal back into an electrical signal. In order to prevent non-linearly distorted echo in such an echo canceling device or method, a high-pass filter (8) is arranged in the input channel (1) which high-pass filter (8) has a cut-off frequency that is beyond the cut-off frequency of the high-pass behavior in the converter (2). The high-pass filter (8) is followed by a limiting element (9) which limits the amplitude of the input signal to the input range of the converter (2). By this means, non-linear behavior in the converter (2) is prevented so that non-linearly distorted echo cannot arise at all.

4 Claims, 3 Drawing Sheets

TELEPHONE ECHO CANCELLER

Figure 1:
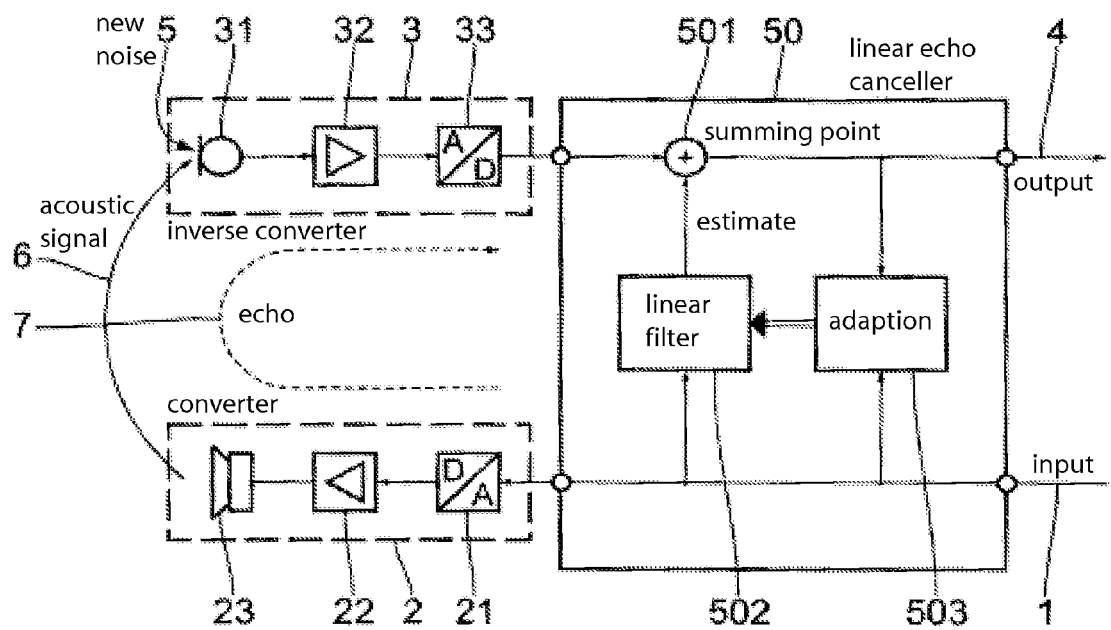

The invention relates to an echo canceling device for an arrangement for transferring audio signals, especially uttered speech, the arrangement comprising an echo filter for canceling echo, which echo filter is arranged between an input channel for receiving an electrical input signal and coming from a far end and leading to a converter for converting an electrical signal into a first audio signal, and an output channel for outputting an electrical output signal and coming from an inverse converter for converting a second audio signal back to an electrical signal and leading to a far end. The invention also relates to an arrangement for receiving and transmitting audio signals as claimed in claim 9. In addition, the invention relates to an echo canceling method. Lastly the invention also relates to a computer program with computer programming means to cause a computer to carry out the steps of said method when the computer program is run on a computer.

The problem of echo can occur when using telephones, especially mobile telephones. Echo is caused by the fact that the microphone of a telephone does not only record and transmit the speech spoken directly into the microphone. Other noise too, especially the acoustic signal output by the speaker of the same telephone is recorded by the microphone and sent back to the person at the other end. This effect occurs particularly when mobile telephones are used in conjunction with hands-free devices, because the microphone is arranged in such a way that it picks up sounds from a large space. Even in mobile telephones without a hands-free device echoes can occur to a greater extent because the acoustic signal from the speaker is transferred to the microphone by the relatively small housing. Such effects can also occur with DECT telephones or radio sets.

It is an especially unpleasant effect when such echoes occur that they become non-linear due to non-linear components in the telephone itself. Such non-linear echoes are perceived as distortion by the user at the far end. In contrast, slight distortions of the speech output at the near end which are caused in mobile telephones or cordless telephones by the high output amplitude, despite the low battery voltages, are accepted.

Most systems for canceling the acoustic echoes described above use a linear adaptive filter. The linear filter then models the echo path and is constantly modified with the aid of adaptation. The signal which passes through the echo path then passes through the model of this section in the linear filter in the same way and is then subtracted from the signal which was captured by the microphone and which also contains the echo, so that in the optimum case the signal picked up by the microphone without the echo is the result. Both time domain filters such as NLMS-Adaptation or frequency-domain filters are used successfully to compensate linear echo. These filters model the echo path so accurately that a reduction of linear echo of up to 30 dB can be achieved.

Non-linearly distorted echoes remain after linear echo has been compensated for. They are caused in particular by limiting elements in the transmission arrangement. They therefore occur particularly when there are loud speech components and very suddenly, which is particularly unpleasant.

So far two approaches have been known for canceling non-linearly distorted echoes. In a first approach a non-linear model is used in addition to a linear filter. Both the linear filter and the non-linear model are adapted, so that even the non-linear behavior of the section of the echo path can be modeled. The echo can thus be compensated for in a way that is quite similar to the linear case described above. In fact it is necessary in the non-linear case for the non-linear model and the non-linear path to match with very great accuracy. This means that it is absolutely essential to use adaptation of the non-linear model. Non-linear adaptation is especially complex and costly to achieve, so that a correspondingly powerful digital signal processor (DSP) is required for this solution, incurring correspondingly high costs.

In a second approach for dealing with non-linear echoes a linear filter with adaptation is furthermore used with additionally the channel leading to a far end being attenuated. This attenuation occurs, on the one hand, only for a relevant frequency range and, on the other hand, works only at times when non-linearly distorted echoes can occur. This additional attenuation of the output channel degrades the speech quality at the near end of the telephone for the case where speech occurs at both ends at the same time. In addition, this approach requires the non-linear distortions to be measured reliably. This requires the hardware to be carefully matched. This method also incurs increased DSP costs. Expenditure of this kind is justified only when the required attenuation element is already provided for other purposes such as additional echo and/or noise canceling.

A method and a device for controlling amplitude in a communications system with linear echo canceling is known from WO 00/70853 in which a signal is limited to the range of a D/A converter.

It is an object of the invention for example to cancel both linear and non-linear echo when audio signals are transmitted, especially in telephones such as, for example, mobile telephones. It is a further object of the invention to cancel echo in a simple and cost-effective way. According to the invention a high-pass filter in the input channel and having a cut-off frequency that is beyond the cut-off frequency of the high-pass behavior of the converter is arranged before the echo filter from the direction of the far end, and a limiting element to limit the signal amplitude is arranged in the input channel between the high-pass filter and the echo filter.

The invention is based on the understanding that the non-linear behavior of the echo path section, especially the behavior from the input channel to the acoustic output of the converter, especially of an amplifier present therein, occurs only beyond a signal amplitude determined by the limitation of the gain of this path. For this reason a limiting element is arranged in the input path, so that the signal coming from a far end is limited in its amplitude, so that non-linear behavior is avoided for this signal.

In addition to the possible non-linear behavior, the echo path in the input channel before the loudspeaker also displays high-pass behavior. High-pass behavior of this kind has a differentiating effect on low-frequency signal components. Therefore, there is a danger that the signal coming from a far end and being amplitude limited is again raised in amplitude in some ranges by differentiating behaviors and again exceeds that previously reached amplitude limit. In order to avoid this problem, a further high-pass filter which filters out the low frequencies from the signal coming from a far end is arranged before the limiting element. The danger of the differentiating behavior in the echo path with the associated amplitude increase can thus be avoided.

The arrangement of the high-pass filter according to the invention followed by the limiting element in the input channel thus has the effect that the signal coming from the far end is restricted to a frequency range above a frequency F1 and below an amplitude Θ. The non-linear elements in the echo path thus have no effect on the echo, so that the echo path actually presents itself only as a linear section. It is therefore possible to cancel the echo for all operating circumstances with the help of a linear filter. This device according to the invention thus avoids non-linearly distorted echo in a simple way. It can be achieved with little effort and thus in a cost-effective manner.

In the simplest known and most commonly used embodiment, limiting elements are characterized by a saturation function. A saturation function has essentially in the third quadrant a constant negative and in the first quadrant a constant positive section and the value of this section corresponds to the extent of limitation. In the region of the origin such a saturation function displays a section with a constant rise joining the two constant sections of the third and first quadrants. According to a preferred embodiment of the invention transitions between the proportional sections passing through the origin and a respective constant section, are soft. These soft transitions and also the remainder of the limiting function characteristics are characterized in particular in that they can constantly be differentiated. Due to the limiting process this results in a signal in which no dips arise and thus no unnecessary distortion of this signal occurs.

In a further preferred embodiment the characteristic of the limiting element is formed by a function composed of a first constant, a first quadratic, a proportional, a second quadratic and a second constant term. The two constant sections and the proportional section are arranged according to a known saturation function. The two quadratic terms each form the transition between the proportional and one of the constant sections. The quadratic terms are parameterized so that all five sections are brought together to form a continuous function.

In a further preferred embodiment the characteristic of the limiting element is formed by a function compiled from a first constant, a first quadratic, a proportional, a second quadratic and a second constant function, where the terms of both quadratic functions are parameterized, so that a cohesive function results which can also constantly be differentiated. In this preferred embodiment a constant and constantly differentiable limitation characteristic is achieved in a simple manner. It places no particular demands on the digital signal processor and can therefore be produced in a simple and cost-effective manner.

In a further preferred embodiment the limiting characteristic is achieved by a tanh function. The tanh function is very similar in its pattern to a saturation function. It has an almost constant and an almost proportional section whose transitions are, however, soft because the tanh function can be constantly multiplied differentially. The use of a tanh function has the advantage that the entire range of the limiting characteristic is fully described with this one function. It is, however, necessary for this special trigonometry function to be implemented in the digital signal processor, or at least be possible to achieve it with the aid of two e-functions and a division.

In a further preferred embodiment a linear and/or adaptive echo filter is used to cancel the echo. The arrangement according to the invention of the high-pass filter and the limiting element is basically independent of the choice of the echo filter used. However, it is thus possible to use a linear filter. This keeps the computational effort small. In addition the linear behavior of the echo path can be known inadequately or not at all and it must also be taken into consideration that the linear behavior of the echo path is variable. This can for example appear from the fact that a telephone may be held in different ways and used in different changing areas. For this reason, adaptation has proved to be advantageous.

In a further preferred embodiment the high-pass filter has a 3 dB cut-off frequency of approximately 0.1 to 2 kHz, in particular of approximately 0.2 to 1 kHz. This frequency range is predetermined by the audible range of the human ear, in particular by the technical composition of regular telephones. A telephone which has small dimensions compared with the subwoofer of a stereo system and which also operates with the use of small amounts of energy is hardly able to produce deep tones, that is, sounds in the low-frequency spectrum. Accordingly, such a telephone already displays high-pass behavior with a cut-off frequency in the lower audible range. The cut-off frequency is typically in the range from 50 to 200 Hz. In order to reliably achieve the prevention of amplitude increase due to differentiating behavior described above, the cut-off frequency of the high-pass filter according to the invention used in the input channel is chosen to be above the cut-off frequency of the high-pass behavior of the echo path.

According to a further preferred embodiment the 3 dB cut-off frequency of the high-pass filter is therefore a factor of about 2 to 10, in particular a factor of about 5 greater than the 3 dB cut-off frequency of the converter. In order to avoid the problem of amplitude increase due to differentiating behavior described above, a factor lower than 2 should not be set for the lower value. The factor should not be greater than 10 either because otherwise there is a danger of the frequency spectrum of the signal being limited too severely. This could result in the transmitted speech appearing very unpleasantly. The voices of the speakers could then sound unusually unnatural. For this reason, the factor 5 has proved to be advantageous.

The invention also relates to an arrangement for receiving and transmitting audio signals with a device as claimed in claim 1. An arrangement of this kind could be for example a mobile telephone, a hands-free system, a radio set or a cordless telephone. The invention also relates to an echo canceling method in such an arrangement as claimed in claim 11 and a computer program to execute this method.

These and other aspects of the invention are apparent from and will be elucidated with reference to the embodiments described hereinafter.

Figure 2:
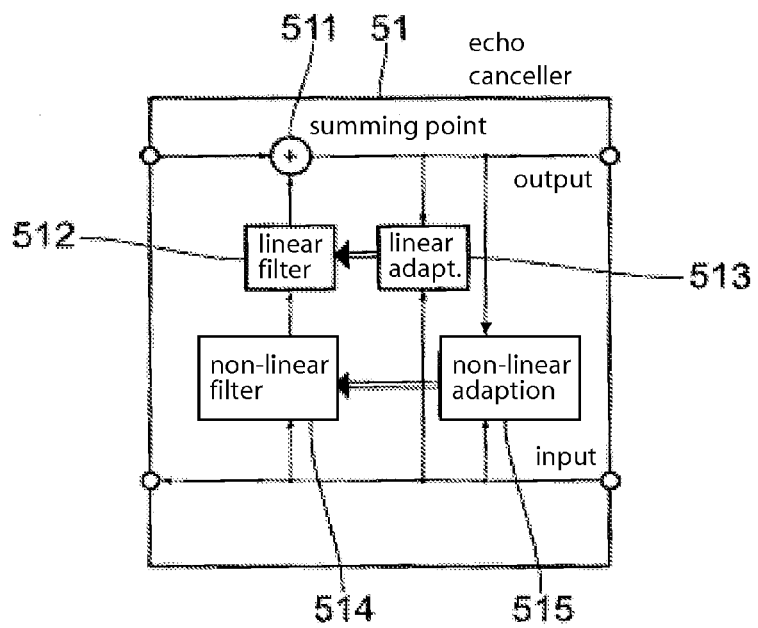
Figure 3:
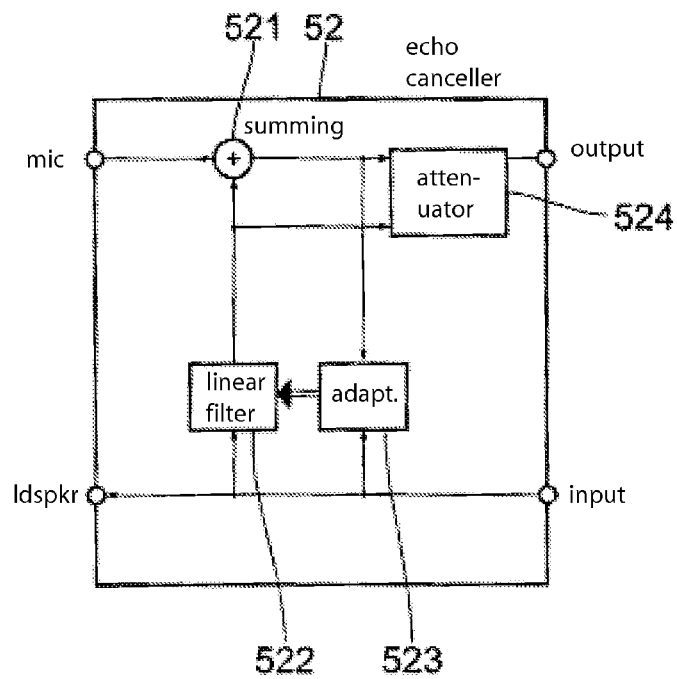
Figure 4:
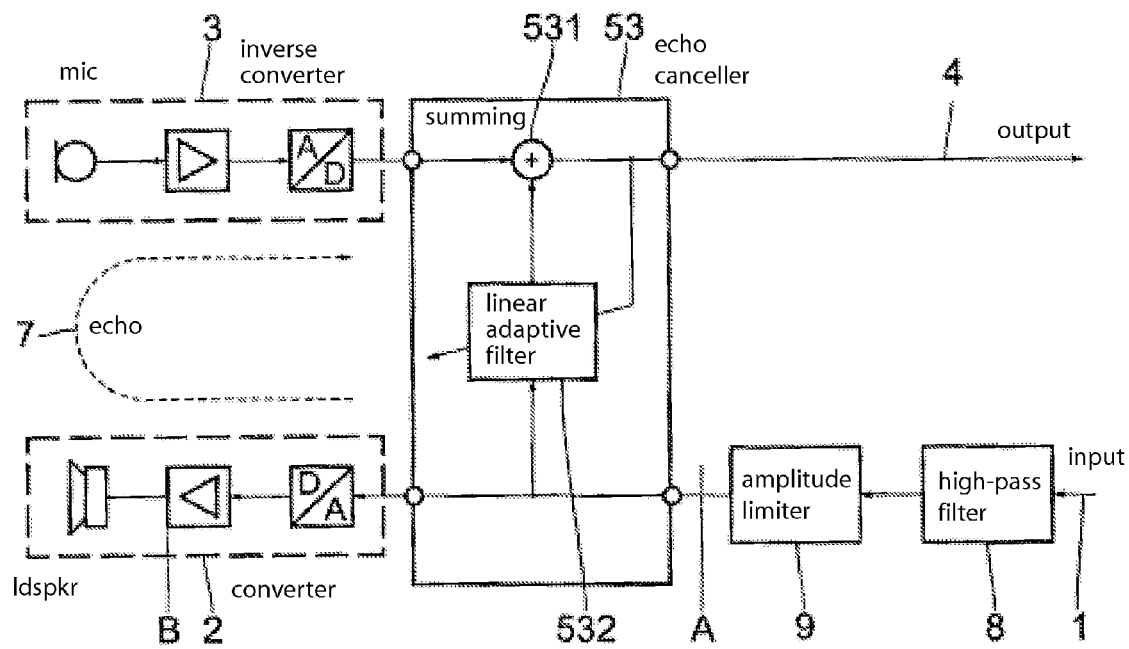
Figure 5:
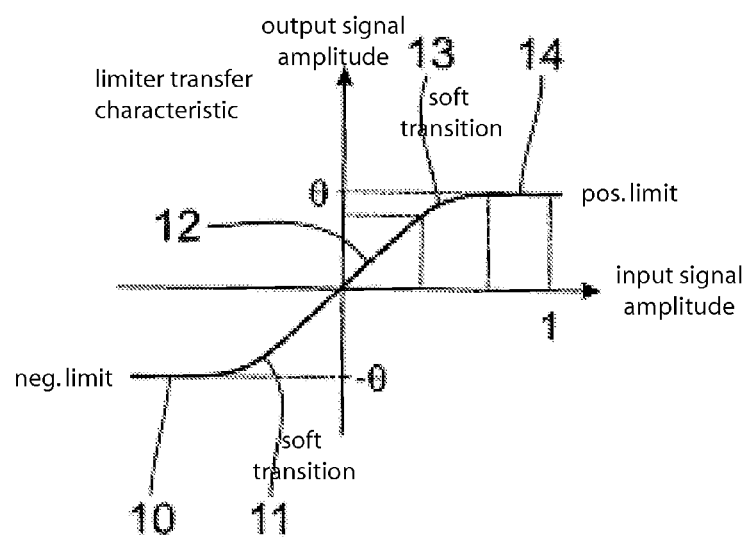
Figure 6:
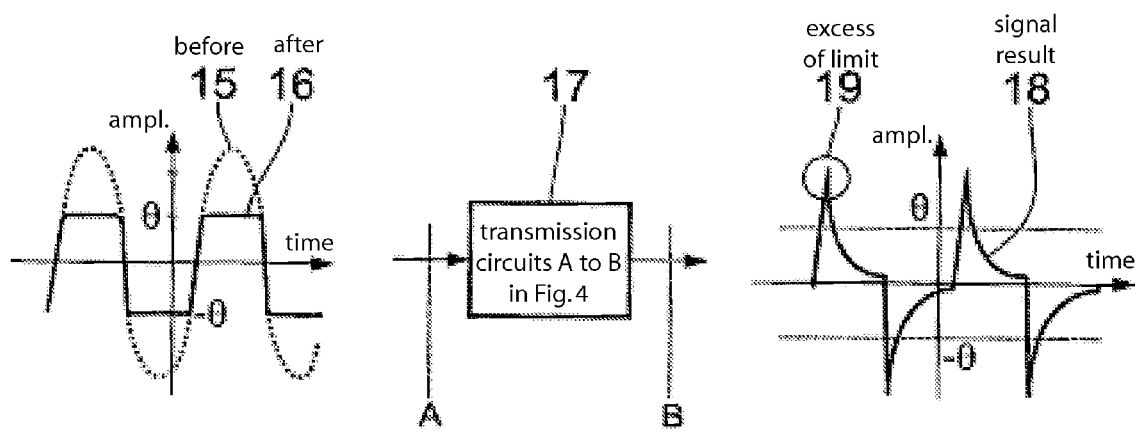

In the drawings:

FIG. 1 shows a circuit arrangement of a commonly used device for canceling linear echo in an arrangement for receiving and transmitting audio signals, FIG. 2 shows a circuit arrangement of a state of the art device for canceling linear echo with a linear and a non-linear filter, FIG. 3 shows a circuit arrangement of a state of the art device for canceling non-linear echo with a linear filter and an additional attenuation unit, FIG. 4 shows a circuit arrangement of a device according to the invention for preventing non-linear echo in an arrangement for receiving and transmitting audio signals, FIG. 5 shows the function graph of a limiting element according to the invention and FIG. 6 shows the transmission behavior in the converter using the example of a limited, but unfiltered signal.

FIG. 1 shows an arrangement for receiving and transmitting audio signals with an input channel 1, a converter 2, an inverse converter 3, an output channel 4 and a linear echo canceling device 50. The circuit arrangement shown in this Figure can be found for example in mobile telephones or hands-free devices. On input channel 1 a digital signal coming from a far end, e.g. a far-end speaker, is received and passed on to the converter 2. In the converter 2 the digital signal is converted into an analog signal with the aid of the D/A converter 21 and then amplified by the amplifier 22 and finally converted into an acoustic signal by the loudspeaker 23. Part of this acoustic signal reaches the inverse converter 3 where, along with the new additional noise, mostly of the speech spoken by the telephone user, is superimposed on this side and is captured by the microphone 31 and converted into an electrical signal. This electrical signal's amplitude is adapted by the inverse converter 32 to the range of the A/D converter 33. The A/D converter 33 converts the thus changed-amplitude analog signal into a digital signal. This digital signal is output by the output channel 4 to be transmitted to a far end.

In order to compensate again for the echo 7 which is superimposed on the new noise 5 at the output of the inverse converter 33, a linear filter 502 in the linear echo canceling device 50 subtracts at the summing point 501 an estimated signal that should correspond to the echo content. For this reason, the linear filter 502 replicates the behavior of the echo path 7. In order to obtain an optimum replication which also adapts to changes in the echo path 7, adaptation is effected via the use of the adaptation block 503.

The linear behavior of the echo path 7 can accurately be replicated with the aid of this linear echo canceling device 50. Linear echoes can be easily canceled in this way. Non-linearly distorted echoes arising from the non-linear behavior of the echo path 7 cannot be compensated for with this device for canceling linear echo.

FIG. 2 shows the circuitry of an echo canceling device 51 with which non-linearly distorted echo is also to be taken into account. This device 51 is used in accordance with the linear echo canceling device 50 according to FIG. 1 in an arrangement for receiving and transmitting audio signals. In addition to the summing point 511 and the linear filter 512 with the associated adaptation block 513, an additional non-linear filter 514 is used in conjunction with a non-linear adaptation block 515. The non-linear filter 514 together with the non-linear adaptation block 515 is then used to replicate the non-linear behavior of the echo path 7.

Using this it is basically possible to model the linear and non-linear behavior of the echo path 7 and thus to compensate for both the linear and non-linearly distorted part of the echo at the summing point 511.

FIG. 3 shows the circuit arrangement of a further prior art echo canceling device 52 which, similarly to the linear echo canceling device 50 in FIG. 1, is used in an arrangement for receiving and transmitting audio signals. This device 52 again comprises a summing point 521 and a linear filter 522 with associated adaptation block 523. With the aid of the linear filter 522 the linear component of the echo can be compensated for at the summing point 521. The remaining non-linearly distorted components of the echo can be partially canceled with the help of the attenuation element 524.

The attenuation element 524 removes the non-linear echo by attenuating the signal coming from the summing element 521 for frequency ranges in which non-linearly distorted echoes can occur. This attenuation takes place only at times when non-linearly distorted echoes can occur. For this reason, the output signal of the linear filter 522 is also fed to the attenuation element 524.

FIG. 4 shows an arrangement for receiving and transmitting audio signals with a high-pass filter 8 and a limiting element 9 according to the invention arranged in the input channel 1. In this arrangement too an echo canceling device 53 is used comprising both a summing point 531 and a linear adaptive filter 532. Here, however, a linear filter can be used together with an adaptation block, so that the echo canceling device 53 results in the same functional principle as in the linear echo canceling device 50 in FIG. 1.

An essential element of the invention is that the signal received on the input channel 1 is first led via the high-pass filter 8 which filters low frequencies out of the signal. The signal thus altered is led via the limiting element 9 which limits the amplitude of the signal. The signal thus modified arrives in the device for canceling echo 53 at, on the one hand, the linear adaptive filter 532 and, on the other hand, the converter 2. The signal altered by the high-pass filter 8 and the limiting element 9 is now formed in such a way that it excites no non-linear behavior in the echo path 7. This ensures that the signal coming from the inverse converter 3 and reaching the summing point 531 contains only linear echo. It is then possible to compensate for this echo at any rate with the aid of the linear adaptive filter 532. This in turn ensures that in all operating instances the signal on the output channel 4 is free from any echo. A further advantage is found in a slightly improved speech reproduction at the near end because distortions sound somewhat softer.

In FIG. 5 the characteristics of the limiting element 9 are shown in the form of a function graph. This graph shows a first constant section 10, a first quadratic 11, a proportional 12, a second quadratic 13 and a second constant section 14. The first constant section 10 sets the negative limit and the second constant section 14 the positive limit of the limiting element to the value $\Theta$. The proportional section 12 shows the slope of one. The first quadratic section 11 is arranged such that it has the slope of zero at the approach to the first constant section 10 and the slope of zero at the approach to the proportional section 12. Thus a soft transition is created from the first constant section 10 to the proportional section 12. The second quadratic section 13 similarly creates a soft transition between the proportional section 12 and the constant section 14. The part of the function graph located in the first quadrant is point symmetrical with the part located in the third quadrant.

In FIG. 6 the transmission behavior of the section from point A to point B in FIG. 4 is shown for a limited signal of low frequency. This shows a signal 15 which was originally somewhat sinusoidal and is transmitted as a signal 16 limited to the amplitude $\Theta$ across the section A-B. The transmission arrangement 17 located between points A and B has high-pass behavior which has a differentiating effect on the low frequencies, so that the signal behavior 18 on the right side of FIG. 6 results. Here it can clearly be seen that the amplitude limitation is lost again by the differentiation. The resulting signal 18 clearly exceeds by a significant amount the limiting value $\Theta$ in some ranges 19.

The signal 15 shown here and thus also the limited signal 16 has a low frequency and has not, as proposed according to the invention, been passed through a high-pass filter. In the arrangement according to the invention a signal that is received by the input channel 1 is first led through a high-pass filter 8. Low-frequency signals can no longer reach or reach the limiting element 9 placed after it only with severely reduced amplitude. The problem illustrated in FIG. 6, of exceeding the limiting amplitude by differentiating signals of low frequency and at the same time high amplitude, can therefore no longer occur. It is thus ensured that a signal received on the input channel 1 even at the output of the section A-B does not in any range exceed the limiting amplitude $\Theta$. By guaranteeing this limited amplitude the occurrence of non-linear behavior can be prevented. Thus the echo does not show any non-linear distortions either and thus a complete cancellation of the echo with the aid of a linear adaptive filter is possible.

In a frequent application the converter of an arrangement for transmitting audio signals has a high-pass behavior with a cut-off frequency of 100 Hz. The high-pass filter according to the invention, which is arranged at the input channel, for this purpose uses a cut-off frequency of 300 Hz. In addition, the converter input voltage range is in this example ±5 volts. Taking a 5% tolerance into account, the critical amplitude Θ of the limiting element also arranged in the input channel is set to 4.75 volts.

This example shows that the parameterization of the high-pass filter and of the limiting element can be done in a simple manner. Furthermore, no particularly complex digital signal processor is necessary for the echo cancellation. Nevertheless, both linearly and non-linearly distorted echo can be efficiently prevented with the aid of this high-pass filter and this limiting element together with a known adaptive linear filter.

The invention claimed is:

1. A telephone echo canceller, comprising:
   an input (1) to receive an audio input signal from a remote telephone;
   an output (4) to send an audio output signal to said remote telephone;
   a high pass filter (8) for removing signals lower than a cutoff frequency from said audio input signal;
   a soft limiter (9) for limiting the amplitude of signals passed through the high pass filter;
   an echo canceller (53) with a summing point (531) and a linear adaptive filter (532), and which inputs signals from the soft limiter (9) for a convener (2) and a loudspeaker, and inputs signals from a microphone and inverse converter (3) for said summing point (531), and has audio output (4) taken from said summing point (531) after subtracting an estimated linear echo provided by said linear adaptive filter (532);
   wherein, the combination of the high-pass filter (8) and soft-limiter (9) substantially eliminate non-linear components from being included in an acoustic echo (7) from said loudspeaker to said microphone, and thereby enable a simple linear adaptation and filtering with said linear adaptive filter to substantially remove any adverse effects of acoustic echo (7) that would otherwise occur.

2. The echo canceller of claim 1, wherein high-pass filter (8) has a 3-dB cut-off frequency in the range of 0.1-2 kHz.

3. The echo canceller of claim 1, wherein high-pass filter (8) has a 3-dB cut-off frequency in the range of two to ten times that of a 3-dB cut-off frequency of the converter (2).

4. A method of echo canceling in a telephone, comprising:
   removing low frequency (8) signal components from an audio input signal received by an input channel (1) from a remote telephone;
   soft-limiting (9) the amplitude of said audio input signal after said removal of said low frequency signal components, such that non-linear acoustic components Will be substantially removed from an echo (7) between a loudspeaker device (2) and a microphone device (3); and
   using only linear adaptation and filtering (532) in an echo canceller (53) connected to the loudspeaker device (2) and microphone device (3) to remove substantially all echoes from an audio output signal at an output (4) directed to said remote telephone.

* * * * *